(12) United States Patent
Hallac et al.

(10) Patent No.: US 9,991,566 B2
(45) Date of Patent: Jun. 5, 2018

(54) CATHODE ACTIVE MATERIAL FOR OVERCHARGE PROTECTION IN SECONDARY LITHIUM BATTERIES

(71) Applicant: Johnson Controls Technology LLC, Wilmington, DE (US)

(72) Inventors: Peter B. Hallac, Milwaukee, WI (US); Sung-Jin Cho, Whitefish Bay, WI (US); Frederic C. Bonhomme, Thiensville, WI (US); Mohamed Taggougui, Bayside, WI (US); David R. Boone, Waukesha, WI (US); Qingfang Shi, Brookfield, WI (US); Alexandre Ndedi Ntepe, Mequon, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 1351 days.

(21) Appl. No.: 13/664,210

(22) Filed: Oct. 30, 2012

(65) Prior Publication Data

US 2013/0115515 A1     May 9, 2013

Related U.S. Application Data

(60) Provisional application No. 61/555,261, filed on Nov. 3, 2011.

(51) Int. Cl.
*H01M 4/485* (2010.01)
*H01M 10/42* (2006.01)
(Continued)

(52) U.S. Cl.
CPC ....... *H01M 10/4235* (2013.01); *H01M 2/345* (2013.01); *H01M 4/0404* (2013.01); *H01M 4/131* (2013.01); *H01M 4/364* (2013.01); *H01M 4/485* (2013.01); *H01M 4/505* (2013.01); *H01M 4/525* (2013.01); *H01M 4/5825* (2013.01);
(Continued)

(58) Field of Classification Search
CPC .... H01M 4/364; H01M 4/485; H01M 4/5825; H01M 10/0525; H01M 4/525; H01M 4/505; H01M 10/4235; H01M 4/0404; H01M 10/44; H01M 2/345; H01M 4/628; H01M 4/131; H01M 2200/20; H01M 2004/028; H02J 2007/0037; H02J 7/0029; Y10T 29/49108
See application file for complete search history.

(56) References Cited

U.S. PATENT DOCUMENTS 4,943,497 A   7/1990  Oishi et al.
5,278,000 A   1/1994  Huang et al.
(Continued)

OTHER PUBLICATIONS

Thackeray et al., "Advances in manganese-oxide 'composite' electrodes for lithium-ion batteries," The Royal Society of Chemistry 2005, www.rsc.org/materials, Journal of Materials Chemistry, pp. 2257-2267. .

(Continued)

*Primary Examiner* — Michael L Dignan
(74) *Attorney, Agent, or Firm* — Fletcher Yoder, P.C.

(57) ABSTRACT

Provided herein is an electrode active material comprising a lithium metal oxide and an overcharge protection additive having an operating voltage higher than the operating voltage of the lithium metal oxide.

3 Claims, 6 Drawing Sheets

(51) Int. Cl.

| | | |
|---|---|---|
| H01M 4/36 | (2006.01) | |
| H01M 4/505 | (2010.01) | |
| H01M 4/525 | (2010.01) | |
| H01M 4/58 | (2010.01) | |
| H01M 10/0525 | (2010.01) | |
| H01M 2/34 | (2006.01) | |
| H01M 4/04 | (2006.01) | |
| H01M 4/131 | (2010.01) | |
| H01M 4/62 | (2006.01) | |
| H01M 10/44 | (2006.01) | |
| H02J 7/00 | (2006.01) | |
| H01M 4/02 | (2006.01) | |

(52) U.S. Cl.
CPC ....... *H01M 4/628* (2013.01); *H01M 10/0525* (2013.01); *H01M 10/44* (2013.01); *H02J 7/0029* (2013.01); *H01M 2004/028* (2013.01); *H01M 2200/20* (2013.01); *H02J 2007/0037* (2013.01); *Y10T 29/49108* (2015.01)

(56) References Cited

U.S. PATENT DOCUMENTS

| | | | |
|---|---|---|---|
| 5,783,333 | A | 7/1998 | Mayer |
| 6,277,521 | B1 | 8/2001 | Gao et al. |
| 6,808,848 | B2 | 10/2004 | Nakanishi et al. |
| 7,309,546 | B2 | 12/2007 | Kweon et al. |
| 7,358,009 | B2 | 4/2008 | Johnson et al. |
| 7,468,223 | B2 | 12/2008 | Thackeray et al. |
| 8,043,387 | B2 | 10/2011 | Morishima |
| 8,067,118 | B2 | 11/2011 | Saito et al. |
| 2001/0003632 | A1 | 6/2001 | Wakihara et al. |
| 2006/0188781 | A1 | 8/2006 | Thackeray et al. |
| 2007/0015055 | A1* | 1/2007 | Lee et al. .......... 429/231.1 |
| 2007/0212609 | A1 | 9/2007 | Iwami |
| 2008/0280203 | A1 | 11/2008 | Yada et al. |
| 2009/0081529 | A1 | 3/2009 | Thackeray et al. |
| 2010/0062337 | A1 | 3/2010 | Sun |
| 2010/0190058 | A1 | 7/2010 | Thackeray et al. |
| 2011/0086248 | A1 | 4/2011 | Nakura |
| 2011/0200848 | A1 | 8/2011 | Chiang et al. |
| 2012/0105007 | A1 | 5/2012 | Amiruddin et al. |
| 2012/0107680 | A1 | 5/2012 | Amiruddin et al. |
| 2012/0183837 | A1 | 7/2012 | Johnson et al. |

OTHER PUBLICATIONS

Chen, et al., "Bifunctional electrolyte additive for lithium-ion batteries," Electrochemistry Communications 9 (2007), www.sciencedirect.com, pp. 703-707.

Moshuchak, et al., "Direct comparison of 2,5-di-tert-butyl-1,4-dimethoybenzene and 4-tert-butyl-1,2-dimethoxybenzene as redox shuttles in LiFePO4-based Li-ion cells," Electrochemistry Communications 9 (2007), www.sciencedirect.com, pp. 1497-1501.

Lee, et al., "Co-Use of Cyclohexyl Benzene and Biphenyl for Overcharge Protection of Lithium-Ion Batteries," Electrochem. Solid-State Lett. 2006, vol. 9, Issue 6, pp. A307-A310.

Dahn et al., "High-Rate Overcharge Protection of LiFePO4-Based Li-ion Cells Using the Redox Shuttle Additive 2,5-Ditertbutyl-1,4-dimenthoxybenzene," J. Electrochem. Soc. 2005, vol. 152, Issue 6, pp. A1283-A1289.

Buhrmester et al., "Studies of Aromatic Redox Shuttle Additives for LiFePO4-Based Li-Ion Cells," J. Electrochem. Soc. 2005, vol. 152, Issue 12, pp. A2390-A2399.

Shima et al., "Reaction mechanisms of aromatic compounds as an overcharge protection agent for 4 V class lithium-ion cells," www.sciencedirect.com, Journal of Power Sources 161 (2006) pp. 1264-1274.

Zhang, "A review on electrolyte additives for lithium-ion batteries," www.sciencedirect.com, Journal of Power Sources 162 (2006) pp. 1379-1394.

Lee et al., "Proton and hydrogen formation by cyclohexyl benzene during overcharge of Li-ion batteries," www.sciencedirect.com, Journal of Power Sources 173 (2007) pp. 972-978.

Thackeray, "Annual Merit Review DOE Vehicle Technologies Program," Washington, D.C., Jun. 7, 2010.

Thackeray et al., "Li2MnO3-stablized LiMO2 (M=Mn, Ni, Co) electrodes for lithium-ion batteries," www.rsc.org/materials, Journal of Materials Chemistry, pp. 3112-3125.

Johnson, et al., "New Cathode Materials," Electrochemical Energy Storage, Chemical Sciences and Engineering Division, Argonne National Laboratory, Argonne, IL, p. 1.

Ishizaki, et al., xLi2MnO3 (1-x)LiNiCoMnO2 Coated by Lithium Metal Phosphate, Meet. Abstr. 2010, vol. MA2010-03, Issue 1, p. 843, The Electrochemical Society 2010.

Kang et al., Enhancing the rate capability of high capacity xLixMnO3 (1-x)LiMO2 (M=Mn, Ni, Co) electrodes by Li-Ni-PO4 treatment, Electrochemistry Communications 11 (2009) pp. 748-751.

Paravasthu, "Thesis—Synthesis and Characterization of Lithium-Ion Cathode Materials in the System (1-x-y) LiNi1/3Co1/3O2 xLi2MnO3 yLiCoO2." Colorado State University, Fort Collins, Colorado, Spring 2012. pp. 1-93.

Kang, "Advanced Nano-Composite Lithium-Metal-Oxide Electrodes for High Energy Lithium-Ion Batteries," The 7th US-Korea Forum on Nanotechnology: Nanomaterials and Systems for Nano Energy, Apr. 2010, pp. 1-24.

Zaghib, "Low Cost SiOx-Graphite and Olivine Materials," Hydro-Quebec (IREQ), 1800 Lionel-Boulet Varennes, QC, Canada Jun. 2010. pp. 1-32.

Feng, et al., "Possible use of methylbenzenes as electrolyte additives for improving the overcharge tolerancs of Li-ion batteries," Journal of Applied Electrochemistry, pp. 1199-1203.

Tobishima et al., "Influence of electrolyte additives on safety and cycle life of rechargeable lithium cells," Journal of Applied Electrochemistry, pp. 143-150.

Shima, et al., "Redox Mediator as an Overcharge Protection Agent for 4 V Class Lithium-Ion Rechargeable Cells," Institute for Materials Chemistry and Engineering, Kyushu University, (2003) pp. 1231-1235.

Xiao et al., "Optimization of EC-based multi-solvent electrolytes for a low temperature applications of lithium-ion batteries," www.sciencedirect.com, Electrochimica Acta 49 (2004), pp. 4857-4863.

Kang et al, "Advanced Nano-Composite Lithium-Metal-Oxide Electrodes for High Energy Lithium-Ion Batteries," Argonne National Laboratory, Abstract page.

International Search Report (dated Feb. 6, 2013).

United States Non-Final Office Action; U.S. Appl. No. 15/202,406; dated Jan. 5, 2018.

* cited by examiner

Fig.6

CATHODE ACTIVE MATERIAL FOR OVERCHARGE PROTECTION IN SECONDARY LITHIUM BATTERIES

CROSS REFERENCE TO RELATED APPLICATIONS

The present application claims the benefit of priority from U.S. Provisional patent application No. 61/555,261 entitled "CATHODE ACTIVE MATERIAL FOR OVERCHARGE PROTECTION IN SECONDARY LITHIUM BATTERIES" and filed on Nov. 3, 2011, the contents of which are hereby incorporated by reference in their entirety to the extent permitted by law.

BACKGROUND

Thermal runaway during overcharge in the lithium ion batteries (LIB) is a safety concern in the automotive industry. Layered metal oxide cathode materials, in particular, impose higher risks of thermal runaway due to their exothermic oxidative reactions with the electrolyte. Battery chargers usually operate at a fixed current or at a fixed power. Consider the case of a fixed current applied to a lithium ion battery containing a lithium metal oxide. The total current leaving each electrode is the sum of all the electrochemical reactions occurring in that electrode. The reactions that may be occurring at the positive electrode during overcharge include: (1) extraction of lithium ions from the lithium metal oxide, (2) side reactions which generate only inert gaseous species, and (3) side reactions which generate gas and/or species which may continue to react after interruption of the current. The relative rates of the reactions depend on the difference between the local electrochemical potential and the redox potential for the particular reaction, which is a function of the local reactant and product concentrations. For the case of a lithium metal oxide, once all of the lithium has been extracted at the redox potential of the oxide, no further oxidation of the active material is possible. Continued application of a charging current will then drive up the cell voltage to potentials at which the side reactions occur at rates sufficient to meet the applied current. That high voltage may lead to unwanted side reactions which generate species that continue to react after the current is interrupted or which generate gas at too rapid a rate, potentially leading to thermal runaway.

Traditionally, electrolyte additives have been employed for the overcharge protection of commercial-grade lithium ion batteries. Examples of such additives are redox shuttles which bypass the overcharge current via a redox reaction between the cathode and the anode. Such compounds usually have redox potentials of 0.2-0.4 V higher than the end-of-charge potential of the positive electrode, or cathode. In another approach, polymer precursors, for instance aromatic compounds such as cyclohexyl benzene and biphenyl are electrochemically oxidized and polymerized thereafter on an overcharged positive electrode to form a passive film that prevents the electrolyte from further reacting with the positive electrode.

SUMMARY

In a first aspect, there is provided an electrode active material comprising a lithium metal oxide and an overcharge protection additive having an operating voltage higher than the operating voltage of the lithium metal oxide.

In a second aspect, there is provided a lithium ion battery comprising a positive electrode comprising a positive electrode active material, a negative electrode comprising a negative electrode active material, and an electrolyte. The positive electrode active material comprises a lithium metal oxide and an overcharge protection additive having an operating voltage higher than an operating voltage of the lithium metal oxide.

In a third aspect, there is provided a method of manufacturing a battery cathode, comprising: forming a mixture comprising a lithium metal oxide and an overcharge protection additive having an operating voltage higher than an operating voltage of the lithium metal oxide, and contacting the mixture with a current collector.

DEFINITIONS

As intended herein, the terms "a" and "an" include singular as well as plural references unless the context clearly dictates otherwise. For example, the term "a lithium metal oxide" can include one or more such oxides.

As intended herein, the terms "approximately" and "about" and similar terms are intended to have a broad meaning in harmony with the common and accepted usage in the art to which the subject matter of this disclosure pertains. It should be understood by those of skill in the art who review this disclosure that these terms are intended to allow a description of certain features described and claimed without restricting the scope of these features to precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

DETAILED DESCRIPTION

The present invention is based on the discovery of novel electrode active materials for electrochemical cell electrodes. Such materials include a lithium metal oxide and an overcharge protection additive having an operating voltage higher than the lithium metal oxide. Also provided are methods, electrodes, cells and systems employing such electrode materials that can promote improved battery performance, safety and/or longevity. These materials, methods, electrodes, cells, and systems are beneficial in a variety of battery applications. For example, the materials can serve as cathode active materials in the positive electrode of lithium cells. When subjected to overcharge, such electrodes have been found to exhibit delayed voltage and temperature increases as compared to electrodes containing traditional materials. This advantageous feature can protect a cell by delaying deleterious overcharge-associated phenomena such as electrolyte oxidation and thermal runaway.

Without being bound to any particular theory, it is believed that, in the event of an overcharge, the protection additive accepts surplus current and prevents sharp potential excursions in electrode potential, leading instead to a gentler, plateau-like voltage curve as the battery is charged beyond full capacity. In some instances, oxygen gas may also be released during the oxidation of the overcharge protection additive, and this evolution of gas may facilitate the activation of a current interrupt device (CID) in the cell. Some overcharge protection additives can also undergo reversible lithium removal during overcharge, i.e. they can intercalate and de-intercalate lithium ions and that in turn contributes to the battery capacity and energy. By contrast, traditional overcharge protection electrolyte additives do not contribute to the capacity of the battery and, when activated by overcharge events, tend to undergo irreversible reactions having adverse effects on the battery performance.

In one aspect, there is provided an electrochemical cell electrode with overcharge protection. The active material of the electrode includes a lithium ion oxide from which energy storage or release is obtained by oxidation or reduction accompanied by lithium ion insertion or removal. An additive that possesses a higher operating voltage than the lithium metal oxide is also included in the active material. In some embodiments, the additive will provide a change in the behavior of open voltage of the electrode (as measured, for example, against a lithium metal electrode $Li^+/Li^0$). As the electrode is charged above the desired state of charge (SOC), the change in voltage is more gradual than as found in an electrode without the additive. In representative embodiments, the change in temperature associated with overcharge is also more gradual than in an unprotected electrode.

As a result, the additive performs the function of reducing and/or delaying overcharge-induced temperature and/or voltage increases as compared to those exhibited by unprotected electrodes. Without being bound to any particular theory, it is believed that, when a battery is overcharged, the oxidation of the protection additive prevents the ignition or explosion of the battery that may be induced by the overcharging. In addition, reversible ion removal enables the additive to contribute to the cell capacity and energy without the disadvantage of deteriorating battery performance that is found in the case of traditional overcharge protection additives.

The lithium metal oxide may be any of those finding use in lithium ion batteries. Typical classes of lithium metal oxides include those of formula $LiMO_2$, where M represents one or more metals, for instance transition metals such as Sc, Ti, V, Co, Mn, Fe, Co, Ni, Cu, Zn, and Al. Lithium metal oxides commonly found in battery electrodes include lithium cobalt oxides (e.g. $LiCoO_2$), lithium nickel oxides (e.g. $LiNiO_2$), lithium manganese oxides (e.g. $LiMnO_2$), lithium nickel manganese cobalt oxides (e.g. $LiNi_{1/3}Mn_{1/3}Co_{1/3}O_2$, also known as NMC), and other oxides comprising other metals partially substituting for Mn, Ni, and Co, such as $LiNi_{0.80}Co_{0.15}Al_{0.05}O_2$. Other representative oxides finding use in battery electrodes include lithium nickel cobalt aluminum oxides, lithium titanates, lithium iron oxides, and lithium vanadium oxides.

The overcharge protection additive may be chosen from among the many materials known to exhibit an operating voltage higher than lithium metal oxides commonly found in battery electrodes. Example overcharge protection additives include the class of compounds known as metal oxide composite materials. Well-known composite materials are those represented in two-component notation as $xLi_2M^1O_3 \cdot (1-x)LiM^2O_2$, where $M^1$ represents one or more of Mn, Ti, Zr, $M^2$ represents one or more of Mn, Ni, Co, and Cr, and x is greater than 0 and smaller than 1. Exemplary among them are manganese oxide composite materials, also known as "Li-rich layered oxides," which can be represented as $xLi_2MnO_3 \cdot (1-x)LiM^2O_2$ (0<x<1) and are believed to include a layered $Li_2MnO_3$ component structurally integrated with a layered $LiM^1O_2$ component. Also included is the class of Li-rich layered oxides which can be represented as $xLi_2M^1O_3 \cdot (1-x)LiM^2{}_2O_4$ (0<x<1) and are believed to feature a layered $Li_2M^1O_3$ component structurally integrated with a spinel $LiM^2{}_2O_4$ component, such as $xLi_2MnO_3 \cdot (1-x)Li_{1+\delta}Mn_{2-\delta}O_4$ (0<$\delta$<0.33). Both the above types of manganese oxide composite materials undergo reversible lithium abstraction upon oxidation, thereby contributing to battery capacity.

Spinels provide another exemplary class of overcharge protection additives that can undergo reversible lithium abstraction upon oxidation. Chief among them are high-voltage spinels ("HVS"), for instance those of formula $LiM^2{}_2O_4$ where, as disclosed above, $M^2$ may be one or more of Mn, Ni, Co, and Cr, such as lithium manganese oxide spinel of formula $LiMn_2O_4$. Other spinels have somewhat more complex formulas, such as $Li_{1+x}[M^1{}_yMn_{(2-y)}]O_4$, where $M^1$ is one or more of Mn, Ni, and Mg. The additive may also be chosen from among lithium metal phosphates. Commonly known phosphates include those of formula $LiM^3PO_4$, wherein $M^3$ where $M^3$ represents one or more metals, for instance transition metals such as Fe, Mn, Co, Ni, Sc, Ti, V, Co, Cu, Zn, and Al. Some such compounds crystallize in the olivine, disordered olivine, or modified olivine structure types. Representative olivine lithium metal phosphates (olivine phosphates) include those of formula $Li_xM^3PO_4$, where x is greater or equal to zero and smaller or equal to 1, and M is one or more of Fe, Mn, Co, and Ni. Exemplary among such olivines are lithium iron phosphate ($LiFePO_4$), lithium manganese phosphate ($LiMnPO_4$), lithium cobalt phosphate ($LiCoPO_4$) and lithium nickel phosphate ($LiNiPO_4$).

In representative embodiments, there is provided a positive electrode active material that includes an operating amount of a lithium metal oxide sufficient to provide a desired operating capacity, and a selected amount of an overcharge protection additive having an operating voltage higher than the lithium metal oxide. The metal oxide and protection additive may be a physical mixture or, for instance, form a solution together with or without the other components of the electrode. There are no specific restrictions on the amount of protection additive present, which may vary on the basis of the operating capacity and amount of overcharge protection desired. Example additive concentration ranges, expressed as a fraction of the weight of the positive electrode material, include from about 1 to about 20 weight %, from about 5 to about 15 wt %, and about 7.5 to about 12.5 wt %. Other example additive concentration ranges include from about 1 to about 30 wt %, from about 5 to about 20 wt %, and about 7.5 to about 15 wt %. In some instances, the positive electrode material may be prepared by co-synthesizing or physically mixing an amount of the lithium metal oxide with the additive in a proportion that is consistent with the state of charge for which one is seeking indication, or in order to provide the desired capacity and voltage for overcharge protection. In one or more embodiments, physical mixtures of these compounds are used for overcharge protection.

In at least some instances involving physical mixing of the lithium metal oxide with an overcharge protection additive, the additive is added in a form from which lithium can be extracted at the desired voltage to function as overcharge protection agent. In certain lithium ion cells, the cell is assembled in a discharged state, and the lithium that is inserted into the positive electrode during discharge is typically the lithium that was initially extracted from the positive electrode during charge. In such an instance, typically all of the lithium that is cycled during use of the battery originates from the starting positive electrode. If the overcharge protection additive in the positive electrode additive is in the lithiated state in the original mixture, lithium extraction during charge occurs first from the lithium metal oxide, and then from the additive in the event of an overcharge.

As an example of an embodiment employing a protective additive, a method is provided to prevent an electrochemical cell from catastrophic failure in the event of accidental overcharge. Often cells are made with a current-interrupt device (CID). The CID is designed so that it conducts current from the cell terminal to the cell electrodes during normal operation. If the pressure in the cell exceeds a certain threshold, the CID deforms, breaking the electrical connection and thus interrupting the current, thereby protecting the cell against further overcharge, which could generate dangerous amounts of gas.

The cell may generate gas during overcharge because the electrolyte or electrode materials are oxidized at potentials beyond the normal operating voltages to produce gaseous products. It is these gaseous products that create the increased pressure that trips the CID. However, in some situations, the species produced during the period of overcharge may continue to react after the current is interrupted. This continuing reaction may further generate heat and gas, leading to thermal runaway, popping of safety vents or even bursting of the cell cap or case. The risk of cell venting is particularly acute if the rate of gas generation is very rapid, in which case the pressure of the cell may rise somewhat above the CID trip pressure in the time that it takes for the CID to activate. Several methods of enabling safe tripping of a CID are known in the art. For example, gassing additives such as biphenyl may be mixed into the electrolyte to generate gas at a potential lower than that at which undesirable reactions begin to occur. However, these additives do not contribute to, and may negatively impact, cell energy or power during normal operation of the cell.

In certain embodiments herein, the overcharge protection additive of the positive electrode material releases gas in the event of an overcharge, thereby reaching the CID trip pressure prior before unwanted overcharge-induced reactions take place. An amount of overcharge protection additive is added to positive electrodes in which the primary active material is a lithium metal oxide. During normal operation, the additive will not be active. If the positive electrode is charged above the redox potential of additive, it will be oxidized. As a result, the cell potential will grow more slowly than it would without the additive. The oxidation of the additive may also generate gaseous products, inducing the CID to trip before the lithium metal oxide or the electrolyte undergoes oxidative side-reactions.

In one aspect, a positive electrode including an above described positive electrode active material is provided. An example method of producing such a positive electrode according will now be described. First, a lithium metal oxide, an overcharge protection additive, a conducting agent, a binder, and a solvent are mixed to prepare a positive electrode active material composition. The positive electrode active material composition can be coated directly on an aluminum collector and dried to prepare a cathode plate. Alternatively, the composition can be cast on a separate support to form a cathode active material film, which film is then peeled from the separate support and laminated on an aluminum collector to prepare a positive electrode plate. One commonly used conducting agent is carbon black. Example binders include vinylidene fluoride/hexafluoropropylene copolymers, polyvinylidenefluoride (PVDF), polyacrylonitrile, polymethylmethacrylate, polytetrafluoroethylene, and combinations thereof. The binder may also be a styrene butadiene rubber-based polymer. Example solvents include N-methylpyrrolidone (NMP), acetone, water, and the like.

A lithium battery including an above described positive electrode is also provided. A method of producing one such battery will now be described. First, a positive electrode including an above described cathode active material composition is prepared. Then, a negative electrode active material, a conducting agent, a binder, and a solvent are mixed to prepare a negative electrode active material composition. The anode active material composition can be coated directly on a copper collector to obtain an anode plate. Alternatively, the negative electrode active material composition can be cast on a separate support to form an anode active material film, which film is then peeled from the separate support and laminated on a copper collector to obtain a negative electrode plate.

Non-limiting examples of suitable negative electrode active materials include lithium metal, lithium alloys, and carbonaceous materials (such as graphite). In the negative electrode active material composition, the conducting agent, the binder, and the solvent may be the same as used in the cathode. In some cases, a plasticizer may be added to the cathode active material composition and the anode active material composition to form pores in the electrode plates.

The cathode and the anode can be separated by a separator. The separator can be any separator that is commonly used in lithium batteries. A suitable separator may have low resistance to ion movement of the electrolyte and high electrolyte retaining capability. Non-limiting examples of suitable separators include glass fibers, polyester, teflon, polyethylene, polypropylene, polytetrafluoroethylene (PTFE) and combinations thereof, each of which can be a woven or non-woven fabric. Foldable separators formed of polyethylene or polypropylene can be used in lithium ion batteries. On the other hand, separators having high organic electrolyte retaining capabilities can be used in lithium ion polymer batteries. A method of preparing a separator will now be described.

A polymer resin, a filler, and a solvent are mixed to prepare a separator composition. The separator composition can be coated directly on an electrode and dried to form a separator film. Alternatively, the separator composition can be cast on a support and dried to form a separator composition film, which film is then peeled from the separate support and laminated on an electrode. The polymer resin is not limited and can be any material used as a binder for an electrode plate. Non-limiting examples of suitable polymer resins include vinylidenefluoride/hexafluoropropylene copolymers, polyvinylidenefluoride, polyacrylonitrile, polymethylmethacrylate, and combinations thereof.

Figure 6:
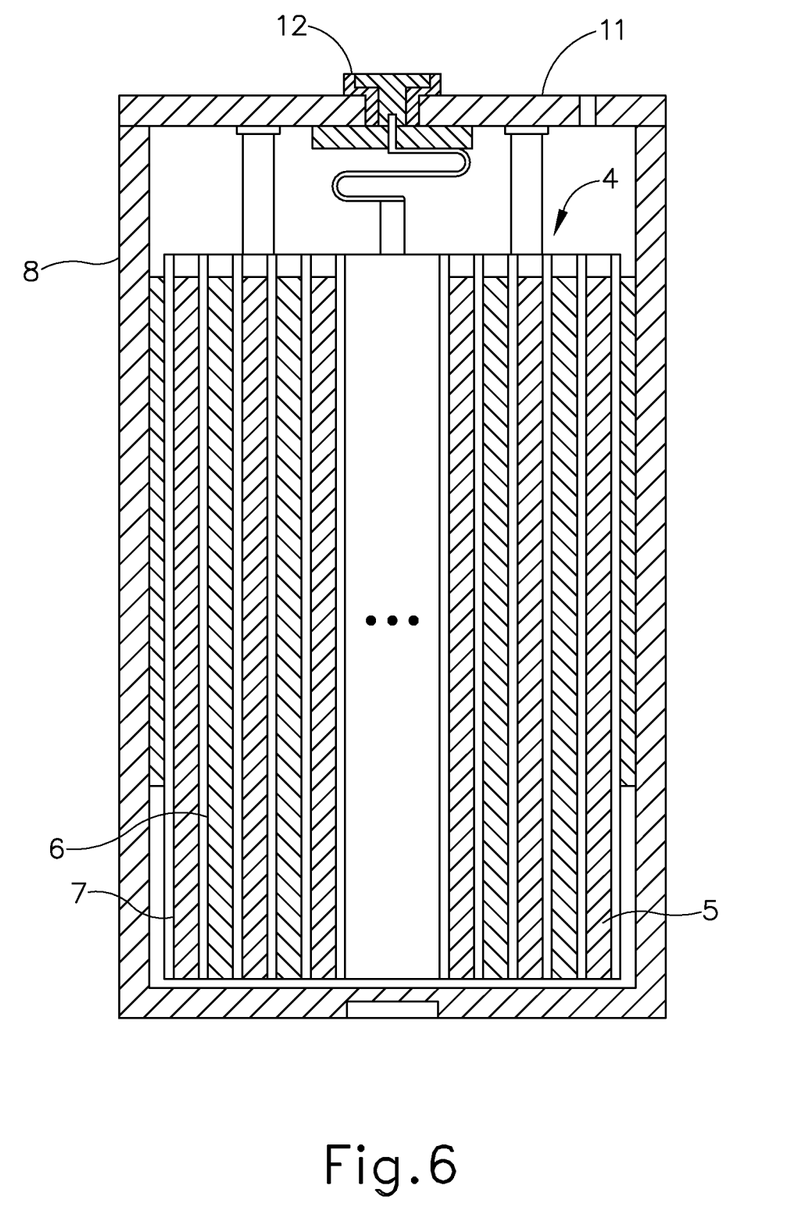
FIG. 6 is a cross-sectional view of an example lithium ion battery.

As shown in FIG. 6, an example lithium battery 3 includes an electrode assembly 4 which includes a positive electrode 5, negative electrode 6 and a separator 7 between the cathode 5 and anode 6. The electrode assembly 4 is enclosed in a battery case 8, which is sealed with a cap plate 11 and gasket 12. An organic electrolyte is then injected into the battery to complete a lithium ion battery. Alternatively, the battery assembly can be stacked to form a bi-cell structure, and then impregnated with an organic electrolyte. The obtained product is then placed in a pouch and sealed, thus completing a lithium ion polymer battery.

The organic electrolyte used in these lithium batteries can include a lithium salt and a mixed organic solvent including a high permittivity solvent and a low boiling point solvent. The high permittivity solvent can be any solvent used in the art. Non-limiting examples of suitable high permittivity solvents include cyclic carbonates (such as ethylene carbonate, propylene carbonate, and butylene carbonate), and gammabutyrolactone. The low boiling point solvent can be any solvent used in the art. Non-limiting examples of suitable low boiling point solvents include linear carbonates (such as dimethyl carbonate, ethylmethyl carbonate, diethyl carbonate, and dipropyl carbonate), dimethoxyethane, diethoxyethane, and fatty acid ester derivatives. The lithium salt can be any lithium salt used in lithium ion batteries. Non-limiting examples of suitable lithium salts include $LiClO_4$, $LiCF_3SO_3$, $LiPF_6$, $LiN(CF_3SO_2)$, $LiBF_4$, $LiC(CF_3SO_2)_3$, $LiN(C_2F_5SO_2)_2$ and combinations thereof. In the organic electrolyte, the concentration of the lithium salt usually ranges from about 0.5 to about 2 M.

As noted above, traditional overcharge protection electrolyte additives do not contribute to the capacity of the battery and are designed or tend to undergo irreversible reactions having adverse effects on the battery performance. By contrast, the inclusion in a cell of an overcharge protection additive capable of reversible ion removal renders such electrolyte additives superfluous while providing protection without sacrificing battery capacity. As a result, in a further aspect, there are provided electrochemical cells substantially free of overcharge protection electrolyte additives such as polymeric film precursors, redox shuttles, and gassing additives. By "substantially free" is meant that a cell contains no overcharge-protecting electrolyte additives at all or in amounts too small to afford meaningful protection against overcharge. Example concentration ranges in such a substantially free electrolyte include less than about 1 wt %, less than 0.5% wt %, less than 0.1 wt %, and less than 0.01 wt % of the protection additive(s). Overcharge protection is instead effected by adding an amount of overcharge protection additive to a positive electrode in which the primary active material is a lithium metal oxide. In some embodiments, the additive can also undergo reversible lithium removal during overcharge. In addition, an additive that produces oxygen when oxidized may be chosen.

It is important to note that the construction and arrangement of electrodes and electrochemical cells as shown in the examples above is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

EXAMPLES

Example (1): NMC Pouch Cells with Li-Rich Layered Oxide or High-Voltage Spinel as Overcharge Protection Additives In order to measure beneficial effects imparted by overcharge protection additives, reference pouch cells having a capacity of 1.25 Ah were first built, as follows. A reference cathode active material composition was formed containing 95 wt % NMC, 3 wt % conductive carbon and 2 wt % of PVDF binder and cast as an NMP slurry on aluminum foil, followed by drying and calendaring. The foil coated with the dried mixture was then folded and pressed to obtain the desired electrode density and thickness. The resulting electrode was slitted and stacked with a cell separator and a lithium negative electrode, to obtain a pouch cell that was ultrasonically welded, filled with an electrolyte containing NMP and $LiPF_6$ and vacuum-sealed.

A first type of Li-rich layered oxide overcharge-protected pouch cells were then built with the same ingredients as the reference pouch cells, with the exception of the NMC which was substituted with a mixture including 90 wt % NMC and 10 wt % of the Li-rich layered oxide $xLi_2MnO_3 \cdot (1-x)LiNi_{1/3}Mn_{1/3}Co_{1/3}O_2$ (0<x<1) as overcharge protection additive. A second type of overcharge-protected pouch cells were also made where the NMC was substituted with a mixture including 90 wt % NMC and 10 wt % of a high-voltage spinel of formula $LiMn_{1.5}Ni_{0.5}O_4$ as overcharge protection additive.

Figure 1:
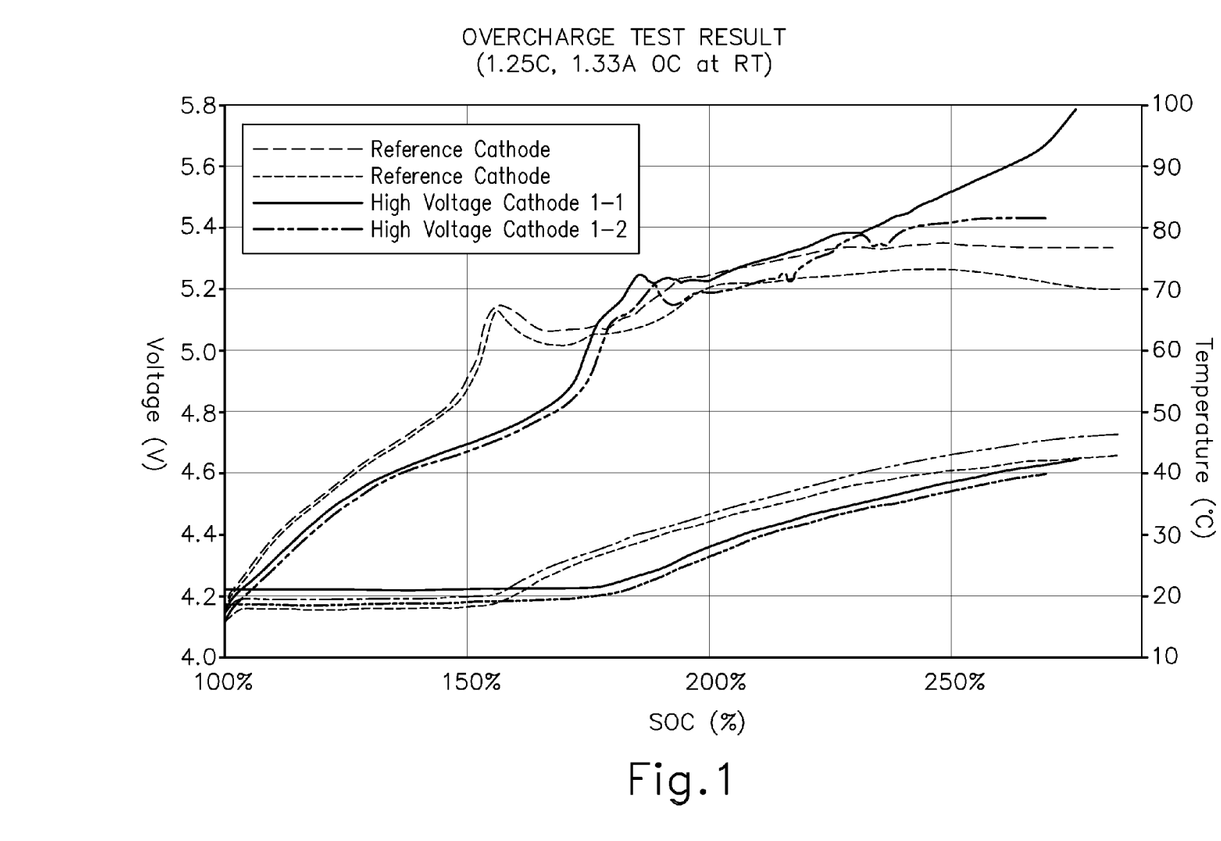
FIG. 1 includes voltage and temperature plots comparing the overcharge properties of the first type of overcharge-protected pouch cells of Example (1) to those of reference cells without overcharge protection additives.
Figure 2:
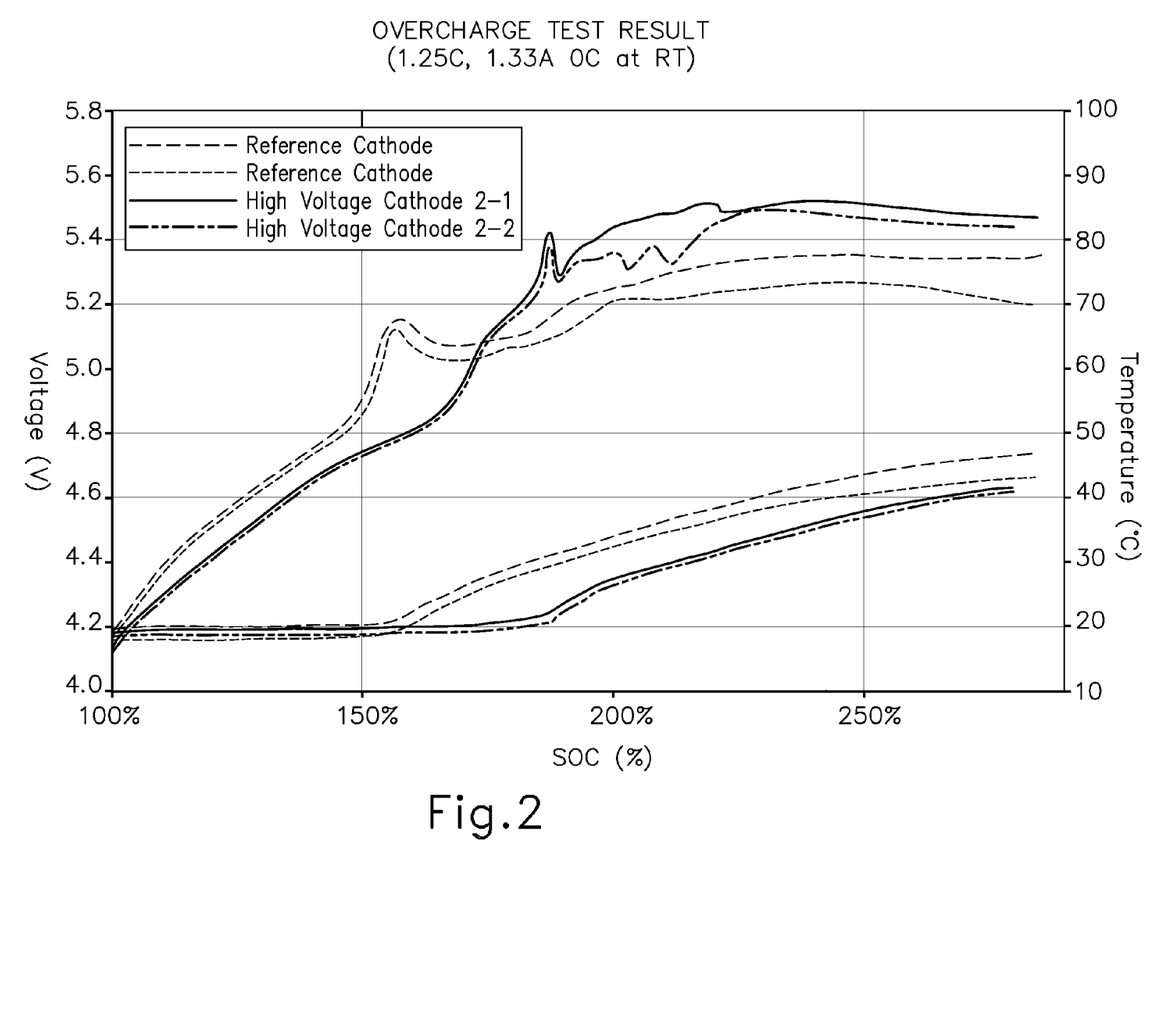
FIG. 2 includes voltage and temperature plots comparing the overcharge properties of the second type of overcharge-protected pouch cells of Example (1) to those of reference cells without overcharge protection additives.

Overcharge-protected cells of the first type were overcharged up to 5.4-5.5 Volts (as measured against) $Li^+/Li^0$ and their temperature and voltage in the course of charging were measured and plotted, as illustrated in FIG. 1. The protected cells (High Voltage Cathode 1-1 and 1-2) showed a delay in the onset of overcharge-induced voltage increases as compared to the reference cells. This improvement was most prominent when the cells were charged beyond 150% SOC. Whereas the reference cells (Reference Cathode) exhibited a rapid surge in potential, the overcharge-protected cells showed a slower increase until a charge of about 175% SOC was reached. The overcharge-protected cells also exhibited a delay in the onset of overcharge-induced temperature increases. Overcharge-protected cells of the second type (High Voltage Cathode 2-1 and 2-2) were also compared to the reference cells, as illustrated in FIG. 2. Here, too, a delay in the insurgence of overcharged-induced voltage and temperature increases was found.

Example (2): Coin Cells with Li-Rich Layered Oxide

A reference coin cell was built as follows. A cathode active material composition was formed containing 94 wt % NMC, 3 wt % conductive carbon, and 3 wt % PVDF binder, which were blended and mixed in NMP, to form a slurry. The slurry was cast on an aluminum substrate and the NMP was removed under vacuum. Discs having a diameter of 0.5 in were then punched and reference coin cells made using lithium as counter electrode. Coin cells with overcharge protection were then made with the same ingredients as the reference coin cell, the only difference being in the cathode active material composition containing 84 wt % NMC and 10 wt % of the Li-rich layered oxide $xLi_2MnO_3 \cdot (1-x)LiMnO_2$ ($0<x<1$) as overcharge protection additive.

Figure 3:
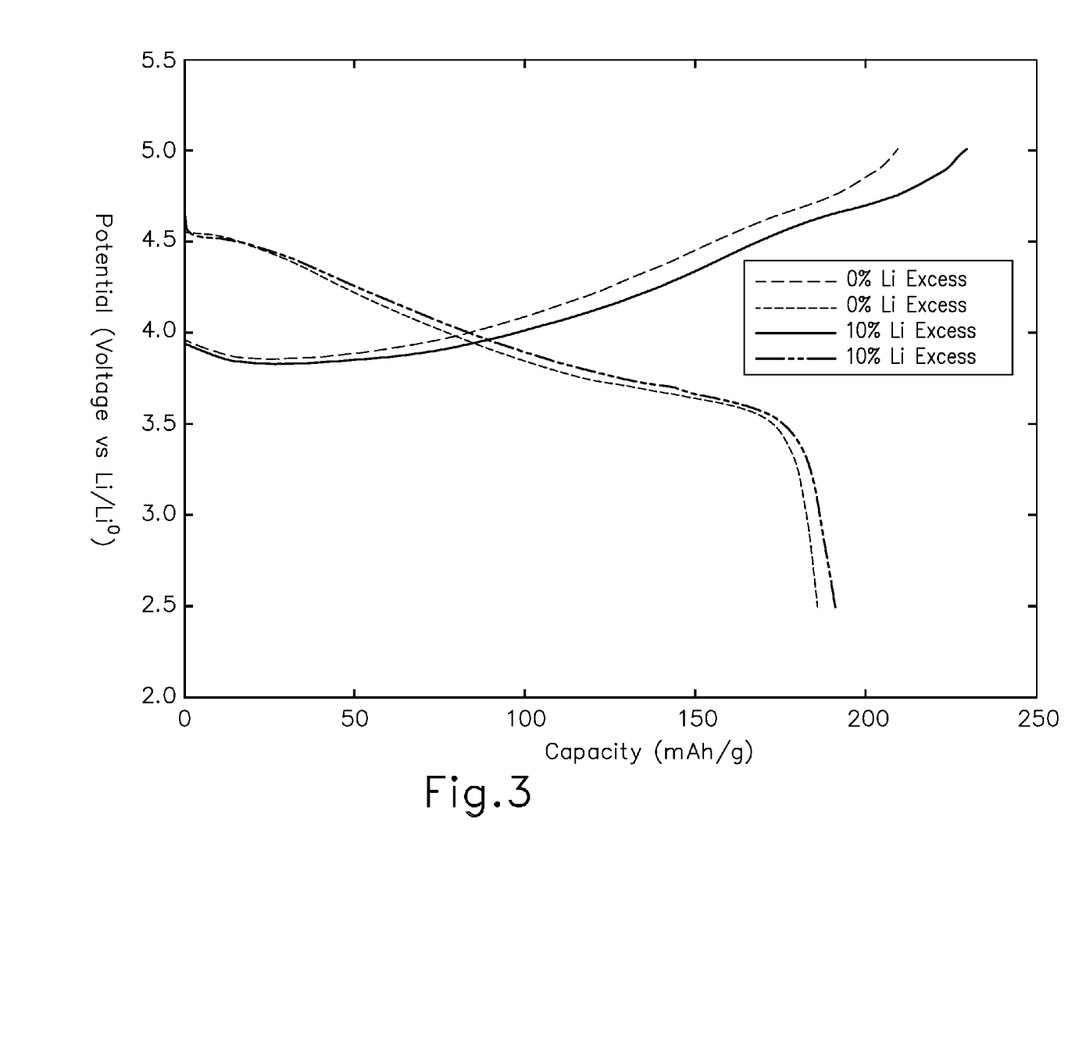
FIG. 3 includes capacity-potential plots comparing the capacity of the coin cells of Example (2) to that of a reference cell without overcharge protection additives.

Coin cells of both types were formed up to the normal cutoff voltage (4.3 V) and discharged to 2.5 V. The cells were then overcharged to 5 V, as illustrated in FIG. 3. Cells with the overcharge protection additive ("10% Li Excess") exhibited a slower voltage increase rate that was indicative of lithium extraction. Such lithium extraction could also be inferred from the higher specific capacity (mAh/g) of the cells with the additive, as calculated on the basis of the overall amount of electrode active material in a cell (NMC+additive).

Example (3): Prismatic Cells

The applicability of the overcharge-protected materials to large batteries suited to automotive applications was tested, as follows. The reference cathode active material composition of Example (1) was included in the cathode of prismatic reference cells having a capacity of 32 Ah. Then, a first type of Li-rich layered oxide overcharge-protected prismatic cells were built with the cathode active material substituting the NMC of the reference cells with the mixture including 90 wt % NMC and 10 wt % of the Li-rich layered oxide $xLi_2MnO_3 \cdot (1-x)LiNi_{1/3}Mn_{1/3}Co_{1/3}O_2$ ($0<x<1$) as overcharge protection additive. A second type of overcharge-protected prismatic cells were also made where the NMC was substituted with a mixture including 90 wt % NMC and 10 wt % of the high-voltage spinel of formula $LiMn_{1.5}Ni_{0.5}O_4$ as overcharge protection additive.

Figure 4:
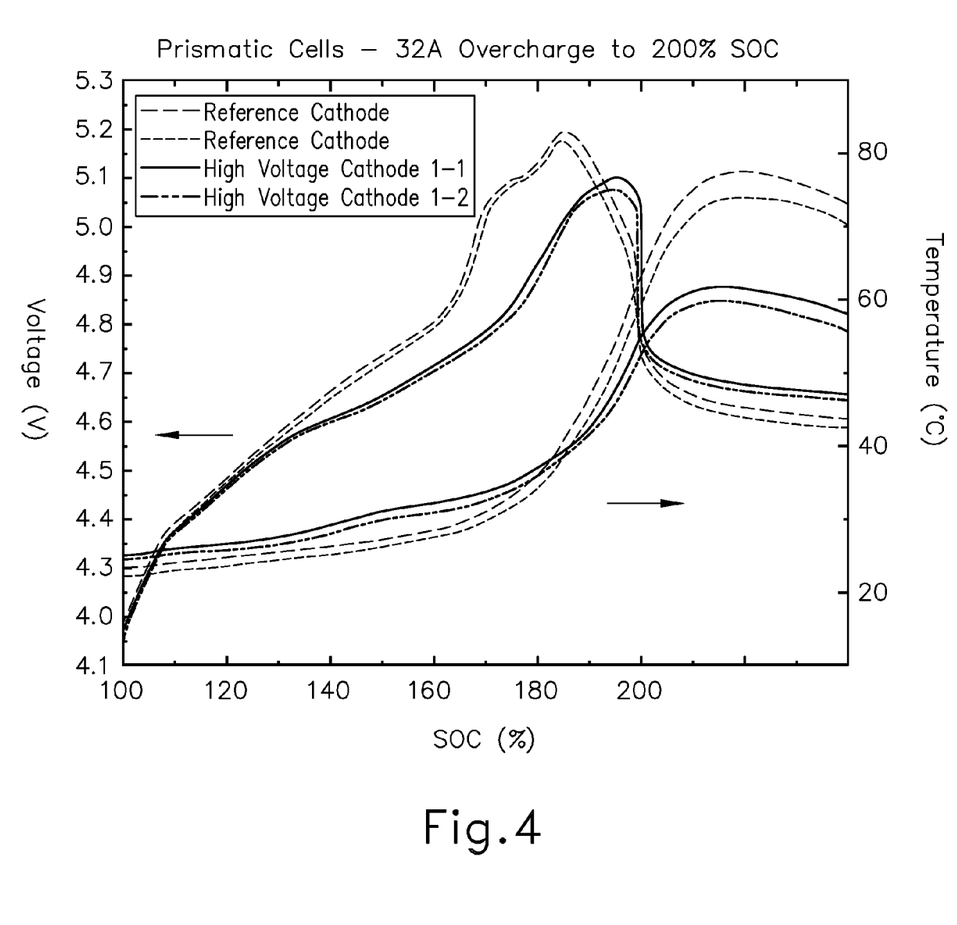
FIG. 4 includes voltage and temperature plots comparing the overcharge properties of the first type of overcharge-protected prismatic cells of Example (3) to those of reference cells without overcharge protection additives.
Figure 5:
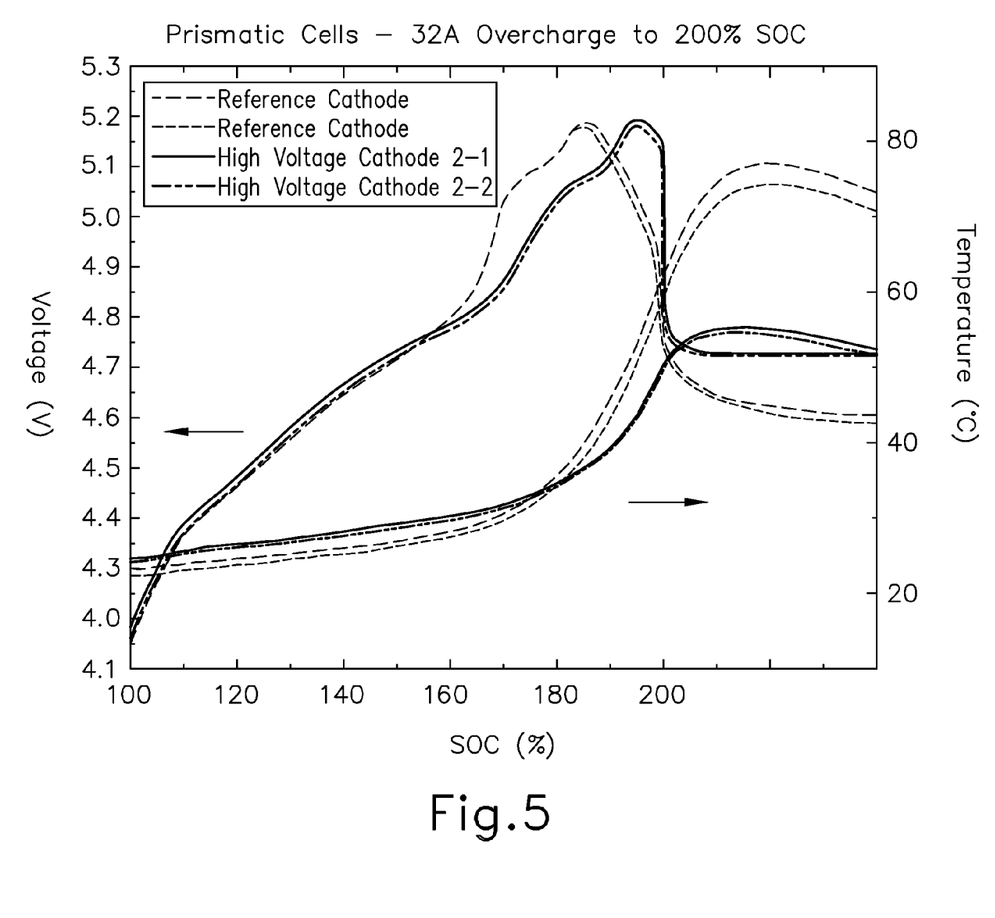
FIG. 5 includes voltage and temperature plots comparing the overcharge properties of the second type of overcharge-protected prismatic cells of Example (3) to those of reference cells without overcharge protection additives.

Overcharge-protected prismatic cells of the first type were overcharged up to 5.1-5.2 Volts (as measured against) $Li^+/Li^0$ and their temperature and voltage in the course of charging were measured and plotted, as illustrated in FIG. 4. Similarly to what was found in Example (1), the protected cells (High Voltage Cathode 1-1 and 1-2) showed a delay in the onset of overcharge-induced voltage increases as compared to the reference cells. This improvement became apparent when the cells were overcharged at 130% SOC and higher. Gentler, slower overcharge-induced temperature increases were also observed, as seen in the temperature plots at 180% SOC and higher. Overcharge-protected prismatic cells of the second type were also compared to the reference cell, as illustrated in FIG. 5. Here, too, a delay in the insurgence of overcharged-induced voltage and temperature increases was observed in the protected cells (High Voltage Cathode 2-1 and 2-2).

The invention claimed is:

1. A positive electrode comprising a physical mixture of a first electrode active material and a second electrode active material coated onto a collector of the positive electrode; and
   wherein the first electrode active material comprises a lithium metal oxide, and wherein the second electrode active material comprises an overcharge protection additive having an operating voltage higher than the operating voltage of the lithium metal oxide, wherein the overcharge protection additive is a Li-rich layered oxide, a lithium oxide spinel, an olivine phosphate, and combinations thereof.

2. A positive electrode comprising a physical mixture of a first electrode active material and a second electrode active material coated onto a collector of the positive electrode; and
   wherein the first electrode active material comprises a lithium metal oxide, and wherein the second electrode active material comprises an overcharge protection additive having an operating voltage higher than the operating voltage of the lithium metal oxide, wherein the overcharge protection additive has the formula $xLi_2M^1O_3(1-x)LiM^2O_2$, wherein: $M^1$ is Mn, Ti, Zr, and combinations thereof; $M^2$ is Mn, Ni, Co, Cr, or combinations thereof, and x is greater than 0 and smaller than 1.

3. A lithium ion battery comprising a positive electrode comprising a positive electrode active material mixture, a negative electrode comprising a negative electrode active material, and an electrolyte, the positive electrode active material mixture comprises a physical mixture of a first electrode active material and a second electrode active material, wherein the first electrode active material comprises a lithium metal oxide, and wherein the second electrode active material comprises an overcharge protection additive having an operating voltage higher than an operating voltage of the lithium metal oxide, wherein the overcharge protection additive is a Li-rich layered oxide, a lithium oxide spinel, an olivine phosphate, and combinations thereof.

* * * * *

UNITED STATES PATENT AND TRADEMARK OFFICE
CERTIFICATE OF CORRECTION

| | |
|---|---|
| PATENT NO. | : 9,991,566 B2 |
| APPLICATION NO. | : 13/664210 |
| DATED | : June 5, 2018 |
| INVENTOR(S) | : Peter B. Hallac et al. |

It is certified that error appears in the above-identified patent and that said Letters Patent is hereby corrected as shown below:

On the Title Page

On Page 2, item (56), under "OTHER PUBLICATIONS", in Column 1, Line 5, delete "dimethoybenzene" and insert -- dimethoxybenzene --, therefor.

On Page 2, item (56), under "OTHER PUBLICATIONS", in Column 2, Line 41, delete "tolerancs" and insert -- tolerance --, therefor.

On Page 2, item (56), under "OTHER PUBLICATIONS", in Column 2, Line 55, delete "Labaratory," and insert -- Laboratory, --, therefor.

In the Drawings

In Fig. 4, Sheet 4 of 6, delete "4.0" and insert -- 4.2 --, therefor.

In Fig. 5, Sheet 5 of 6, delete "4.0" and insert -- 4.2 --, therefor.

In the Specification

In Column 4, Line 42, delete "wherein $M^3$ where $M^3$" and insert -- wherein $M^3$ --, therefor.

In Column 7, Line 12, delete "cathode 5 and anode 6." and insert -- cathode 6 and anode 5. --, therefor.

In Column 7, Line 35, delete "LiN (CF$_3$SO$_2$)," and insert -- LiN(CF$_3$SO$_2$), --, therefor.

In Column 8, Line 49, delete "LiMn$_{15}$Ni$_{0.5}$O$_4$" and insert -- LiMn$_{1.5}$Ni$_{0.5}$O$_4$ --, therefor.

In Column 8, Line 52, delete "(as measured against)L$^+$/Li$^0$" and insert -- (as measured against L$^+$/Li$^0$) --, therefor.

Signed and Sealed this
Eighteenth Day of June, 2019

Andrei Iancu
*Director of the United States Patent and Trademark Office*

In Column 9, Line 49, delete "(as measured against) $L^+/Li^0$" and insert -- (as measured against $L^+/Li^0$) --, therefor.